US010499026B1

(12) United States Patent
Banta

(10) Patent No.: US 10,499,026 B1
(45) Date of Patent: Dec. 3, 2019

(54) AUTOMATION CORRECTION OF PROJECTION DISTORTION

(71) Applicant: Amazon Technologies, Inc., Seattle, WA (US)

(72) Inventor: William Christopher Banta, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 15/194,205

(22) Filed: Jun. 27, 2016

(51) Int. Cl.
*H04N 9/31* (2006.01)

(52) U.S. Cl.
CPC ......... H04N 9/3194 (2013.01); H04N 9/3182 (2013.01); H04N 9/3185 (2013.01)

(58) Field of Classification Search
CPC ... H04N 9/3194; H04N 9/3182; H04N 9/3185
USPC .................. 348/602, 189; 382/203; 455/88; 345/214, 156
See application file for complete search history.

(56) References Cited

U.S. PATENT DOCUMENTS

| 9,686,388 | B2* | 6/2017 | Naiki .................. H04N 9/3173 |
| 2006/0164517 | A1* | 7/2006 | Lefebure ................ G06K 9/228 348/222.1 |
| 2008/0062164 | A1* | 3/2008 | Bassi ................... H04N 9/3147 345/214 |
| 2009/0245681 | A1* | 10/2009 | Kobayashi ................ G06T 7/80 382/275 |
| 2009/0245682 | A1* | 10/2009 | Imai ........................ G06T 5/006 382/275 |
| 2010/0177283 | A1* | 7/2010 | Tanaka ................ G03B 21/147 353/69 |
| 2011/0055729 | A1* | 3/2011 | Mason .................. G06F 3/0425 715/753 |
| 2012/0019441 | A1* | 1/2012 | Ueno ................... G03B 21/142 345/156 |
| 2013/0235092 | A1* | 9/2013 | Nakashin ................. G09G 5/10 345/690 |
| 2014/0066127 | A1* | 3/2014 | Naiki .................... H04N 9/3173 455/556.1 |
| 2014/0080428 | A1* | 3/2014 | Rhoads ............. G06F 17/30241 455/88 |
| 2015/0062542 | A1* | 3/2015 | Appia .................. H04N 9/3185 353/69 |
| 2015/0302560 | A1* | 10/2015 | Sumiyoshi ............. G09G 3/001 382/203 |
| 2015/0381955 | A1* | 12/2015 | Takagi ................. H04N 9/3185 348/46 |

(Continued)

*Primary Examiner* — Michael E Teitelbaum
*Assistant Examiner* — Sean N. Haiem
(74) *Attorney, Agent, or Firm* — Lee & Hayes, P.C.

(57) ABSTRACT

This application describes techniques for correcting distortion in projected images. In some instances, a projection device may project an image onto a projection surface within an environment. However, the projected image may initially distorted from the perspective of a user within the environment due to the angle of the projection onto the surface and due to the location of the user relative to the projection. To help correct this distortion from the vantage point of the user, the user utilizes a mobile device to capture an image of the projection. This image is then used to calculate one or more calibration parameters for execution by the projection device to remove the distortion of the image as projected from the perspective of the user.

20 Claims, 6 Drawing Sheets

(56) References Cited

U.S. PATENT DOCUMENTS

| | | | |
|---|---|---|---|
| 2016/0062486 A1* | 3/2016 | Bozyk | H04N 9/3173 |
| | | | 345/156 |
| 2016/0140714 A1* | 5/2016 | Hara | G06T 5/002 |
| | | | 348/189 |
| 2017/0097738 A1* | 4/2017 | Athavale | G06F 3/0425 |
| 2018/0063496 A1* | 3/2018 | Kasuga | H04N 5/74 |

* cited by examiner

AUTOMATION CORRECTION OF PROJECTION DISTORTION

BACKGROUND

Homes and other environments are becoming more wired and connected with the proliferation of computing devices such as desktops, tablets, entertainment systems, and portable communication devices. Some of these computing devices output visual content by projecting the content within the environments, although certain environmental characteristics may degrade the quality of the projection. For instance, when content is projected on an uneven surface or at an angle relative to the surface, the projection may appear distorted. Further, the color of the surface, the amount of ambient light, and the like may impact the quality of the projection of the image on the surface.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
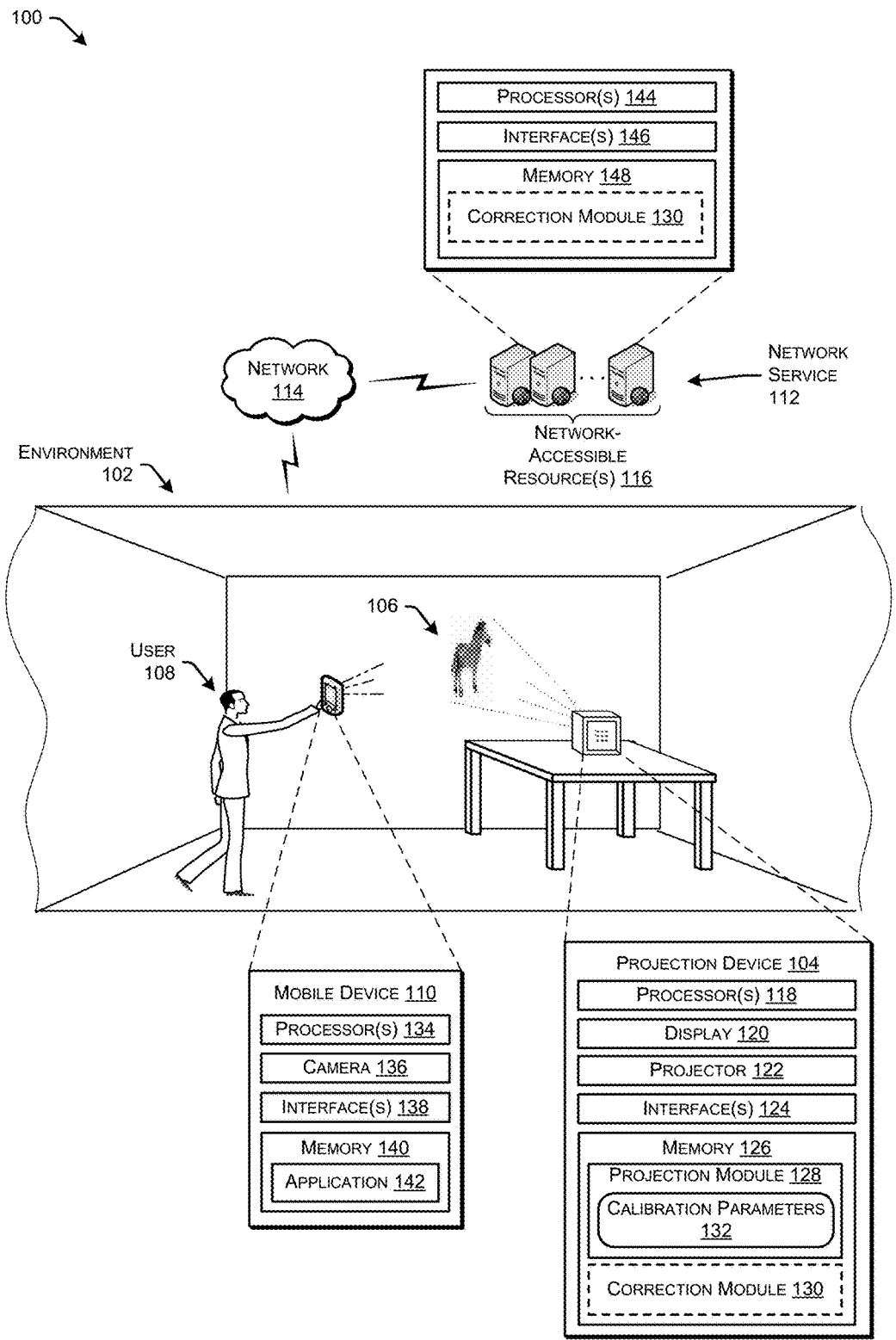
FIG. 1 is a schematic diagram of an illustrative environment that includes a projection device projecting an image onto a surface in the environment. In this example, the projected image is initially distorted from the perspective of a user within the environment due to the angle of the projection onto the surface and due to the location of the user relative to the projection. To help correct this distortion from the vantage point of the user, the user utilizes a mobile device to capture an image of the projection, which is used to recalibrate the projector.

Techniques for correcting distortions in projected content are described herein. As introduced above, an image being projected onto a surface in an environment might suffer from distortion in the form of keystone effects, color distortion, sharpness distortion, brightness distortion, and the like. For instance, when an image is projected onto a surface at a non-perpendicular angle, the projection may experience keystone effects, causing the image to display according to an aspect ratio or shape that is different from the original reference image used to generate the projection. In another example, a color of the surface may cause a color of the projection to differ from the intended color specified by the reference image. In another example, ambient light on the surface may cause the brightness of the image to differ from the intended brightness as specified by the reference image. In another example, the distance between the projection device and the surface may be too short or too far for the current zoom settings of the projection device, thus resulting in the projection suffering from a lack of sharpness. Of course, while a few examples have been described, it is to be appreciated that distortion may occur in a projection based on an array of other environmental factors.

In addition, the projection may take on different appearances based on a location of a user that is within the environment. For example, if a user is viewing an image straight-on (i.e., at a perpendicular angle relative to the projection surface), then the image may appear to have fewer keystone effects than if the user views the image from a smaller angle relative to the projection surface. Therefore, the characteristics of the surface on which the image is projected, the orientation of the projection device relative to the projection surface, and the orientation of the user relative to the projection surface may all play a role in a projection appearing as distorted to a user.

As described below, however, the projection device may be re-calibrated to reduce distortion from the perspective of the user. For example, after the projection device projects an image onto a surface, a mobile or other client device of the user may execute an application that instructs the user to capture an image of the projection from a location at which the user plans to view the projection. For instance, if the projection device is located within the kitchen, the application executing on the mobile device of the user may instruct the user to capture, using a camera of the mobile device, an image of the projection from a location within the kitchen corresponding to where the user plans to view the image.

After the mobile device captures the image, the mobile device, the projection device, or a network service may determine an amount of distortion present in the image of the projection. For instance, a correction component, executing on the mobile device, the projection device, the network service, and/or another entity, may compare the projection as represented in the captured image to a reference image used by the projection device to project the content, while taking into account the field-of-view (e.g., based on location and orientation) of the mobile device that captured the image as well as information regarding the mobile device that captured the image. For instance, given that different mobile devices use different cameras, the different properties of these cameras may impact the calibration parameters to correct the distortion from the captured image. That is, the correction component may identify the reference image corresponding to the content being projected (at a time when the mobile device captured the image) to identify changes in shape, aspect ratio, color, brightness, sharpness and the like between the two images. After identifying one or more of these differences, the correction component may then compare each respective difference to a respective threshold to determine if the difference is greater or less than the threshold. If the difference is less than the threshold, then the correction component may refrain from taking an action to correct the difference.

If, however, a difference between the projection as represented by the captured image and the reference image is greater than the threshold, then the correction component may attempt to cure the distortion to lessen or eliminate the difference. For example, the correction component may calculate one or more calibration parameters that, when implemented by the projection device, would lessen or remove the distortion. For instance, if the correction component determines that the projection is suffering from keystone effects, the correction component may calculate a calibration parameter that, when implemented by the projection device, effectively skews or intentionally distorts the image being projected such that it appears at the appropriate shape, size, and/or aspect ratio when viewed from the location at which the image was captured by the mobile device.

While the above example describes instructing the user to capture the image from the viewing location at which the user plans to view projection, in other instances the user may be instructed to capture multiple images such that the projection device can alter the calibration parameters as the user moves through the environment. For instance, the application may instruct the user to capture a first image at a far-left side of the projection and a second image at a far-right side of the projection. The projection device or the network service may then determine the amount of distortion in the first image and the amount of distortion in the second image. Based on this distortion, the device or network service may calculate first calibration parameters for the first location and second calibration parameters for the second location. Further, the device or network service may interpolate between these first and second calibration parameters for viewing locations between the first and second locations (i.e., the far-left and far-right locations). Therefore, as the user moves to different locations within the environment, the projection service may determine the angle associated with the user's current location and may implement the appropriate interpolated calibration parameters. In some instances, the user's location may be determined via a camera of the projection device, Bluetooth communication between the projection device and a mobile device of the user, motion sensors, radar (e.g., LIDAR), vibration sensing, or the like.

Further, while the above examples describe capturing an image of the projected image by a mobile device, other cameras may be utilized. For instance, security cameras or other types of fixed cameras may be used to capture images of the projected image to identify the distortion.

In some instances, the projection device comprises a raster-scanning laser projector that scans an area of the projection surface in parallel lines, with each pixel of the projected image having the same size (e.g., length and height). Although use of same-sized pixels may provide an adequate quality projected image when the projection device is perpendicular to the surface, some amount of keystone effect distortion generally occurs when projecting to a non-perpendicular surface or to a surface that is not locally flat at all points as discussed above. To correct this keystone-effect distortion, within each scan line, the lengths of pixels in the projected line are modulated such that the length of each pixel projected onto the surface is approximately equal. For example, when projecting onto portions of the surface closer to the projector, longer pixels may be projected. When projecting onto portions of the surface farther from the projector, shorter pixels may be projected. Because the keystone effect tends to distort same-sized pixels to appear smaller if projected onto a closer surface, this adaptation in pixel size compensates for the distortion to provide projected pixels of similar size.

To change the length of pixels in a scan line in this manner, a modulation frequency for a light emitter that generates the pixels is varied to modify the pixel lengths. For example, during rasterization the length of pixels may be changed by turning on or off a light emitting device (e.g., a laser). If the light emitting device is left on for a longer period, then the generated pixel is longer. In some instances, a modulation intensity may be varied along with the frequency to provide for a more equal intensity of the projected pixels even as the frequency of pixel generation is altered.

In other instances, a scanning speed is varied by changing a speed at which various scan-controlling mirrors are moving with the raster-scanning laser projector. In this example, slower movement of the mirrors leads to shorter pixels, and faster movement of the mirrors leads to longer pixels. In some cases, it may be more feasible to control the frequency for pixel generation than to control the scan speed, particularly at those speeds at which pixel variations occur within the exemplary systems described herein.

Moreover, in some instances the height of pixels is similarly adjusted to compensate for distortion. For example, when projecting an image that includes multiple raster-scanned lines, the distance between the lines could be modulated so that it is variable across the lines. If the projection surface is closer to the projection device then the lines would tend to be closer together thus distorting the projected image, so the projection device operates to compensate by projecting the lines further apart. In some embodiments, this may be accomplished by modulating the angle at which a mirror within a raster-scanning laser projector reflects the beam, to project the lines with a more equal spacing on the projection surface. Some embodiments may employ multiple mirrors for controlling scanning (e.g., two mirrors for two dimensional adjustment), and in such cases the movement speed of each mirror may be modified to achieve the desired line spacing and/or scanning speed.

Still other instances may employ raster-scanning laser projectors that include micro-electromechanical system (MEMS) mirrors to control direction and movement of the scan line. In such cases, the pixel height may be altered by changing the direction of the MEMS mirrors through a change in the excitation voltage. Because MEMS mirrors tend to seek a resonant mode of vibration, in some cases it may be difficult to use position changing of MEMS mirrors to control scanning speed across raster lines. Thus, some embodiments may use the frequency alteration method described above to control pixel length, while using MEMS mirror adjustments to control pixel height by varying line spacing.

Further, some projection devices described herein may employ multi-surfaced mirrors (e.g., hexagonal or octagonal mirrors) instead of or in addition to MEMS mirrors. Such multi-surfaced mirrors rotate at a controllable frequency and provide a reflection (e.g., a light emission for pixel generation) each time a mirror passes a laser. Thus, pixel generation lengths may be controlled by controlling the rotational frequency of the multi-surfaced mirror.

Moreover, instead of scanning each line one after another some embodiments may employ array of elements (e.g., a number of laser diodes) to scan multiple lines at once. In such cases, line spacing may be controlled with multiple MEMS mirrors, one MEMS mirror in front of each element. The MEMS mirrors may be set at different angles to modulate the line spacing as the scan progresses. In this way, batches of an area or a whole area may be scanned at once.

Further, some projection devices may generate multiple scan lines by directing a laser or other light source through a bar generator to light a line of spacial light modulators such as digital light processing (DLP) or liquid crystal display (LCD) elements, so that each element provides a scan line. MEMS mirrors may then be employed to increase or decrease the distance between lines. In such cases, other light sources than a laser may be used. For example, a light-emitting diode (LED) may be employed. However, because a LED does not generate collimated, coherent light as generated by a laser, use of LEDs for a light source may introduce additional optical effects that may be avoided through use of a laser for a light source.

In addition or in the alternative to correcting these keystone effects, the correction component may correct other types of distortion, such as color distortion, brightness distortion, sharpness distortion, and/or the like. For instance, the correction component may compare the RGB values of one or more pixels to RGB values as specified by the reference image to determine if the color is off by more than a threshold. For instance, if the projection device is projecting on a blue wall, one or more of the pixels (or all) of the projection may appear as too blue as compared to the intended color of the image as specified by the reference image. As such, the correction component may calculate a calibration parameter to lessen the blue in the RGB values of the affected pixels in the source image used by the projection device to generate the projection.

In another example, the correction component may compare a sharpness or brightness of the projection to a sharpness of the reference image. If the sharpness and/or brightness differs by more than the threshold amount, then the correction component may calculate and output one or more calibration parameters to align the respective brightness and/or sharpness. Of course, while a few examples have been listed, it is to be appreciated that multiple calibration parameters may be utilized to fix any other type of distortion found in the projection.

After the correction component calculates one or more calibration parameters, the correction component may provide these parameters directly or indirectly to the projection device. Upon receiving the parameters, the projection device may execute the parameters such that projection, as viewed from the location at which the image was captured, more closely resembles the reference image as intended.

In some instances, the correction component may request verification that the distortion has been corrected. For instance, after the projection device executes the received calibration parameters, the application on the mobile device of the user may instruct the user to again capture an image of the projection from the same or similar location (unless the user would like to view the projection from a new location). After the mobile device captures the image, the application may again provide this image to the correction component, which may again compare the projection as represented by the captured image to the reference image being used to generate the projection. If the differences there between are less than the threshold, the correction component may confirm that the distortion has been removed or lessened to a satisfactory degree. If, however, differences larger than a threshold still exist, the process may repeat, as discussed above, to remove or lessen the distortion in the projection as viewed from the location of the user.

Furthermore, the correction component may be configured to re-calibrate the projection device upon certain calibration triggers. For instance, the projection device may include one or more motion sensors (e.g., accelerometers, gyroscopes, etc.). Upon detecting that the projection device has experienced a threshold amount of motion via the motion sensors, the projection device is configured to invoke the correction component to execute the process, described above, beginning with issuing a request that a user capture an image of the projection. In other examples, meanwhile, the correction component (or another correction component executing on the projection device) may directly update the calibration parameters based on the motion. For instance, if the projection device determines that it has rotated a certain amount, a correction component executing on the projection device (or remotely there from) may calculate how much to alter the calibration parameters to generally maintain the accuracy of the projection as viewed from the location at which the image was initially captured by the mobile device. The projection device may then implement the recalibrated parameters. In some instances, the application executing on the mobile device may again request that the user capture an image to ensure that distortion between the projection as represented by the image and the reference image generally agree. In other instances, the correction component may be configured to re-calibrate the projection device periodically (e.g., every hour or day), in response to the projection device being powered on, or in response to any other trigger.

FIG. 1 is a schematic diagram 100 of an illustrative environment 102 that includes a projection device 104 projecting an image 106 onto a surface in the environment 102. As illustrated, the projected image 106 is initially distorted from the perspective of a user 108 within the environment 102 due to the angle of the projection onto the surface and due to the location of the user 108 relative to the projection 106. To help correct this distortion from the vantage point of the user 108, the user 108 utilizes a mobile device 110 to capture an image of the projection, which is used to recalibrate the projection device 104. The projection device 104 may project any type of visual content, including images and video. In this example, the projection device 104 projects an image of a zebra, although the projected image 106 of the zebra is distorted due to keystone effects.

In some instances, the user 108 operates the mobile device 110 to capture an image of the projection 106. The mobile device 110 then provides this image to a network service 112, which functions to identify distortion between the projection 106 as represented by the captured image and a reference image used to generate the projection 106 (e.g., the source image of the zebra in this example). In addition, given that the orientation of the camera of the mobile device 110 relative to the projection 106 may also introduce distortion, the mobile device 110 may also send field-of-view (FOV) data to the network service 112. In some instances, the FOV data represents an orientation of the mobile device 110 (e.g., relative to the surface on which the content is being projected) and may be provided by a motion sensor, such as a gyroscope, accelerometer, or the like. In some instances, the network service 112 may use this FOV data when determining the reference image to compare the captured image to. That is, the network service 112 may acquire the image sent to the projection device 104 for output, and may modify this image based on the FOV data to generate the reference image for comparison. In other instances, meanwhile, the network service 112 may refrain from doing so, and instead may simply use as the reference image the image sent to the projection device 104.

In either instance, after identifying the distortion, the network service 112 then calculates one or more calibration parameters that, when implemented by the projection device 104, will result in the projected image 106 more closely resembling the reference image. As such, the network service 112 may send, over a network 114, the calibration parameters directly to the projection device 104, to the mobile device 110 for sending to the projection device 104, or the like. After receiving the calibration parameters, the projection device may execute the calibration parameters, thus updating the projection of the image 106 and removing or lessening the distortion experienced at the location of the mobile device 110 and user 108. While this illustration depicts the network service 112 as calculating the calibration parameters, it is to be appreciated that the mobile device 110, the projection device 104, and/or another entity may be configured to calculate these parameters.

In some instances, the network service 112 resides within the home environment 102 while in other instances the network service 112 resides remotely from the home environment 102. The network 114 may represent an array or wired networks, wireless networks (e.g., WiFi), or combinations thereof. In some instances, the network service 112 is a "cloud-based service" implemented as a computing infrastructure of processors, storage, software, data access, and so forth that is maintained and accessible via the network 116, such as the Internet. Cloud-based services may not require end-user knowledge of the physical location and configuration of the system that delivers the services. Common expressions associated with cloud-based services, such as the network service 112, include "on-demand computing", "software as a service (SaaS)", "platform computing", "network accessible platform", and so forth. As illustrated, the network service 112 may comprise one or more network-accessible resources 116, such as servers, discussed in further detail below.

The projection device 104, meanwhile, may include one or more processors 118, a display 120, a projector 122, one or more network interfaces 124, and memory 126. The memory 126, as well as each memory described herein, may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 126 may be implemented as computer-readable storage media ("CRSM"), which may be any available physical media accessible by the processor(s) 110 to execute instructions stored on the memory 126. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 118.

In this example, the projection device 104 includes the display 120 on a first side of the device 104 and the projector 122 configured to project content from an opposite side of the device. The display 120 may comprise a liquid crystal display (LCD), a light-emitting diode (LED) display, an electronic paper display, and/or any other type of display. The projector 122, meanwhile, may comprise any sort of projection-based technology configured to project an image onto a projection surface, including digital light processing (DLP) projectors, beam-steering projectors, liquid crystal on silicon (LCoS) projectors, and/or the like. The interfaces 124, meanwhile, may comprise any sort of wired and/or wireless interface for communicating with other devices, such as the mobile device 110 and the resources 116 of the network service 114.

As illustrated, the memory 126 of the projection device has access to a projection module 128 and, potentially, a correction module 130. The projection module 128 functions to project images, such as the projected image 106, using source images (e.g., still images or video). In some instances, the projection module 128 projects these images using one or more calibration parameters 132, which may dictate the brightness settings, zoom settings, color settings, and the like. Furthermore, the calibration parameters 132 may dictate how to correct for keystone effects, such as how to module the lengths of pixels in the each projected scan line such that each pixel projected onto the surface is approximately equal. Additionally or alternatively, the calibration parameters 132 may dictate how to modulate the frequency and/or intensity of the light emitter than that generates the pixels for the purpose of modifying the resulting pixel lengths. Further, the calibration parameters may indicate how to vary a scan speed at which scan-controlling mirrors of the projector 122 move with the laser of the projector 122. In still another example, the calibration parameters 132 may indicate how to modulate the vertical distance between scan lines for the purpose of correcting for vertical distortion. Of course, while a few examples have been described, it is to be appreciated that the calibration parameters 132 may be used to correct any other type of distortion in any other manner.

The correction module 130 functions to calculate these calibration parameters 132 such that the projected image 106 appears undistorted from the perspective or field-of-view of the user 108. In some instances, the correction module 130 resides on the projection device, while in other instances it may reside on the mobile device 110 and/or the resources of the network service 112.

The mobile device 110, meanwhile, comprises one or more processors 134, a camera 136, one or more interfaces 138, and memory 140. The memory 140 may store a client application 142 which may be assist in the process for correcting distortion of images projected by the correction device 104. For instance, the client application 142 may communicate, directly or indirectly, with the projection device 104 to determine when the projection device projects an image, such as the image 106. In response to determining that the projection device 104 is projecting an image, the application 142 may prompt the user to capture an image of the projection 106 for the location from which the user 108 plans to view the image. As such, the application 142 may invoke the functionality of the camera 136 to allow the user to capture the image of the projection 106. In some instances, the mobile device 110 may then provide this image to the network service 112.

As illustrated, the network service 112 may include one or more processors 144, one or more interfaces 146, and memory 148. The memory 148 may store an instance of the correction module 130 which, as discussed above, may calculate one or more of the calibration parameters 132 for lessening distortion in the projection 106 from a field-of-view of the camera 136 of the mobile device 110 and/or the user 108.

For instance, upon receiving the image from the camera 136, the correction module 130 may determine, from a time stamp associated with the image, the time at which the image was obtained. The correction module 130 may then determine the reference image used by the projection device 104 to generate the projection 106 at that same time. In other instances, the correction module 130 may instruct the projection device to project a particular calibration image while instructing, via the application 142, the user 108 to capture an image of the projection of the calibration image.

In either instance, the correction module 130 compares the image captured by the camera to the reference image used to generate the projection 106 to identify any differences there between. As discussed above, in some instances the correction module 130 may modify the reference image based on the FOV data received from the mobile device 110, representing the field-of-view of the camera when the camera acquired the image of the projection 106. By modifying the reference image in this way prior to comparison against the captured image, the correction module 130 effectively neutralizes any distortion introduced by the orientation of the camera/mobile device as well as distortion introduced by the properties of the particular associated with the device that captured the image.

When comparing the captured image to the reference image, the correction module 130 may determine whether a shape or aspect ratio of the captured image differs from the reference image by more than a threshold amount. If so, then the correction module 130 may calculate one or more calibration parameters for adjusting the projection by the projector 122 to more closely align the shape and aspect ratio of the projection, as viewed by the user 108, with the reference image. Additionally or alternatively, the correction module 130 may compare a color, brightness, and/or sharpness of the projection as represented by the received image to the color, brightness, and/or sharpness of the reference image to determine differences there between. If any of the color, brightness, or sharpness differs by more than a threshold amount, then the correction component 130 may calculate one or more calibration parameters for correcting this distortion. For instance, the correction module 130 may determine to alter one or more color values of the source image used by the projector 122 to more closely match the resulting projection 106 with the reference. Or, the correction module 130 may increase or decrease a brightness at one or more pixels to more closely align the brightness of the resulting projection with the reference image. In still another example, the correction module 130 may alter a focus or zoom setting of the projector 122 to more closely align a sharpness of the projection 106 with the reference image. Further, it is noted that in some instances certain settings, such as the color or brightness, may be adjusted on a per-pixel or per-pixel-block basis. For instance, the correction module 130 may determine to alter a color of a first pixel in a first manner and a color of a second pixel in a second manner.

Figure 2:
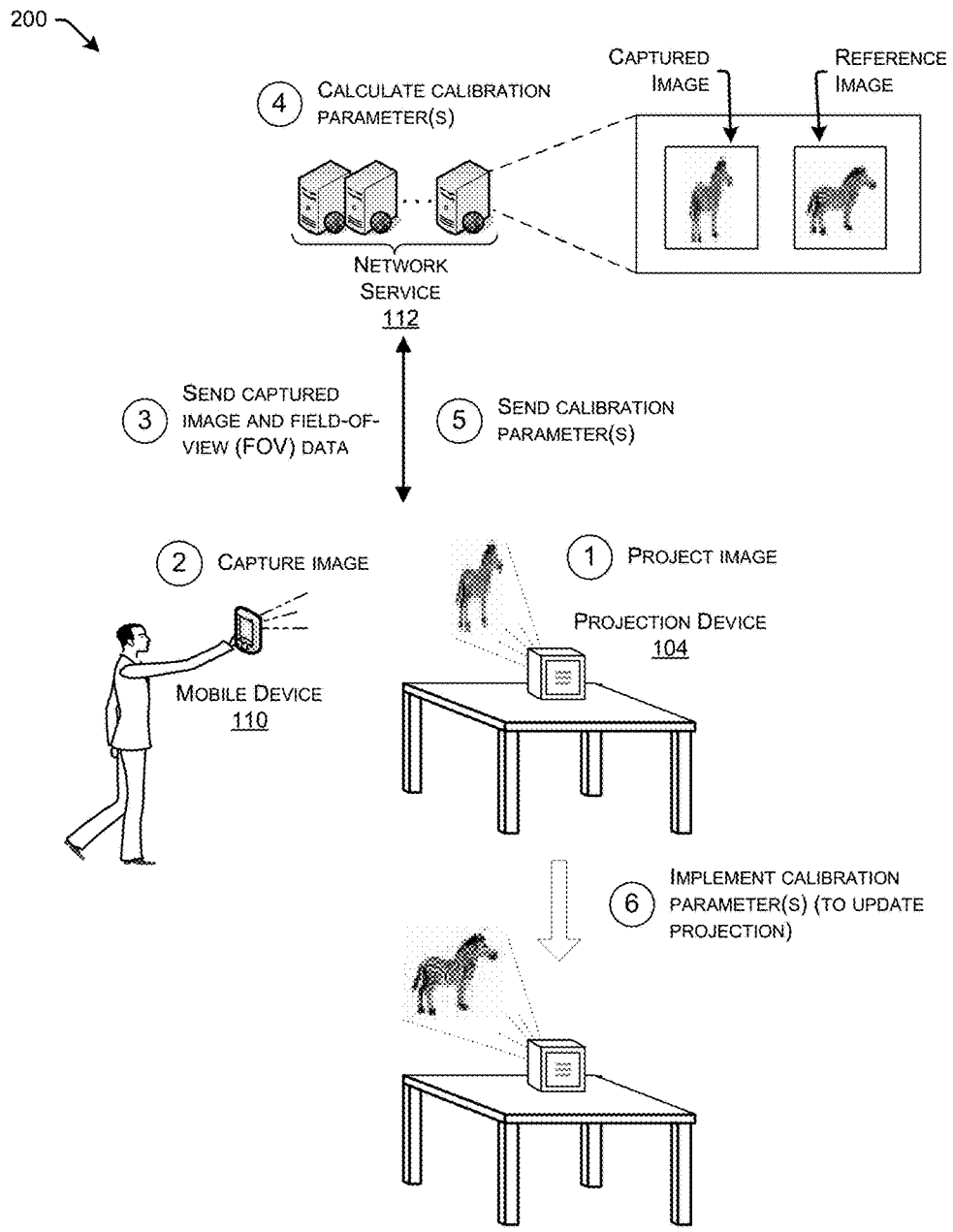
FIG. 2 illustrates an example scenario where a network service interacts with one or more of the devices in the user environment for calculating calibration parameters for correcting the distortion of the projection from the perspective of the user.

FIG. 2 illustrates an example scenario 200 where the network service 112 interacts with one or more of the devices in the user environment 102 for calculating calibration parameters for removing the distortion of the projection 106 from the perspective of the user 108. As illustrated, at "1" the projection device 104 projects an image on a surface within the environment 102. This image may comprise a still image or a portion of a video. In each instance, the image may be a calibration image or may correspond to content requested by the user 108 to be projected. In this example, the image comprises a still image of a zebra, although the projection is distorted due at least to the angle of incidence at which the image is being projected on the surface.

At "2", the user 108 utilizes a camera of his mobile device 110 to capture an image of the projection on the projection surface. In some instances, an application executing on the mobile device may instruct the user 108 to capture this image, requesting that he do so from a location at which he plans to view images projected by the projection device 104. Upon capturing the image, the mobile device 110 may send this image to the network service 112 at "3". In some instances, the mobile device 110 also sends, before, after, or along with the image, FOV data representing the field-of-view of the camera when the mobile device captured the image. In some instances, one or more motion sensors, such as a gyroscope, accelerometer, or the like, may generate the FOV data. At "4", the network service 112 calculates one or more calibration parameters for removing or lessening distortion from the projection from a perspective or field-of-view of the camera, which functions as a proxy for a perspective or vantage point of the user 108.

For example, the network service 112 may analyze the received image with respect to a reference image used to generate the projection. Based on this analysis, the network service 112 may identify different types of distortion, such as keystone effects, color distortion, brightness distortion, sharpness distortion, and/or the like. In the example of keystone effects, the network service 112 may implement keystone-correction algorithms to determine to distort or skew output of the reference image at the projection device to remove or lessen distortion of the resulting projection as viewed at a location of the user 108. In the example of color, meanwhile, the network service 112 may determine how to adjust the color such that the resulting projection on the chosen projection surface more closely resembles the intended color specified by the reference image. In some instances, the make or model of the mobile device, or the camera of the mobile device, may affect the captured image and, hence, the corrected calibration parameter. As such, in some instances the network service 112 may pre-compile how to adjust calibration parameters based on previous testing of different device or camera makes and models. Therefore, upon receiving the image from the mobile device 110, the network service 112 may also determine the make or model of the device and/or camera for use in calculating the calibration parameters(s).

At "5", after calculating the calibration parameters, the network service 112 sends these parameters to at least one of the mobile device 110 or the projection device 104. For instance, the network service 112 may send these parameters to the mobile device 110 over the network, which may send the calibration parameters on to the projection device 104, potentially via a short-range wireless communication (e.g., via Bluetooth, Zigbee, etc.). At "6", upon receiving the calibration parameters the projection device may implement the parameters, thus updating the projection, which now has less distortion from the perspective of the user 108. In some instances, the scenario 200 may further include requesting that the user 108 repeat the process in order to verify that the distortion has been removed to a sufficient degree.

Figure 3:
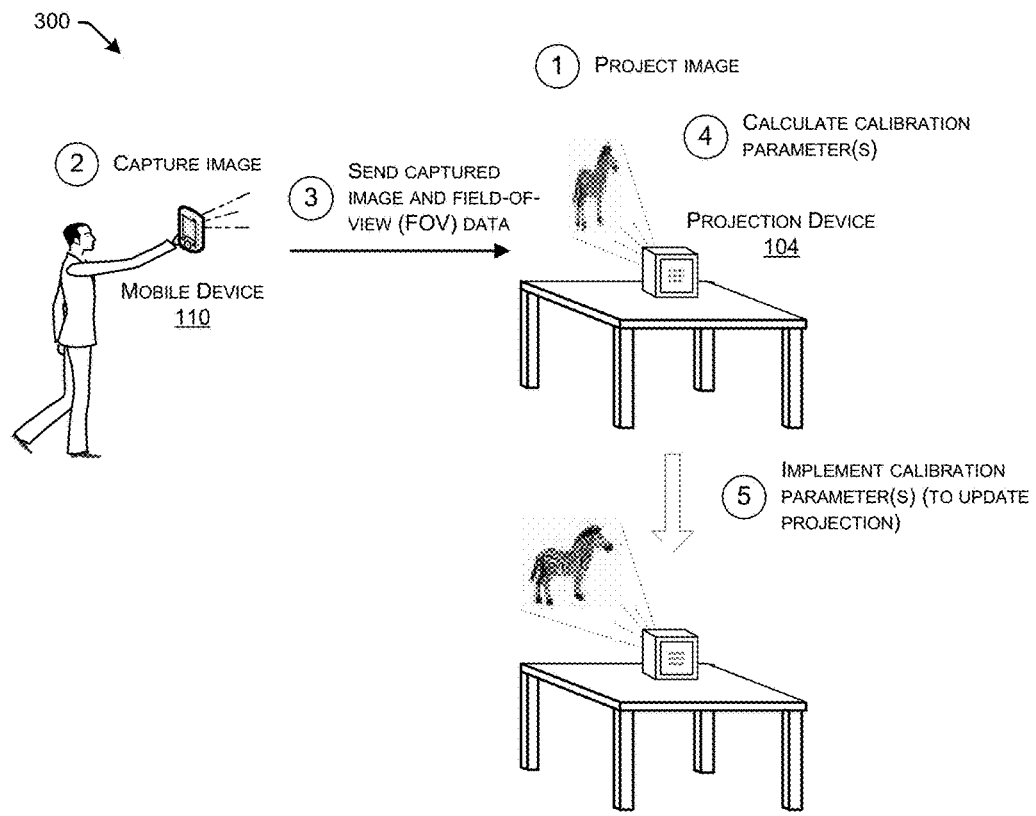
FIG. 3 illustrates an example scenario where the mobile device of the user and the projection device interact with one another to calculate the calibration parameters for correcting the distortion of the projection from the perspective of the user.

FIG. 3, meanwhile, illustrates an example scenario 300 where the mobile device 110 of the user 108 and the projection device 104 interact with one another to calculate the calibration parameters for removing the distortion of the projection from the perspective of the user 108. That is, in this example one or both of the mobile device 110 and the projection device 104 may calculate the calibration parameters, rather than the network service 112. At "1", the projection device 104 again projects an image on a surface within the environment 102. Again, in this example, the image comprises a still image of a zebra, although the projection is distorted due at least to the angle of incidence at which the image is being projected on the surface.

At "2", the user 108 utilizes a camera of his mobile device 110 to capture an image of the projection on the projection surface. In some instances, an application executing on the mobile device may instruct the user 108 to capture this image, requesting that he do so from a location at which he plans to view images projected by the projection device 104. Upon capturing the image, the mobile device 110 may send this image to the projection device 104 at "3". In some instances, the mobile device 110 also sends, before, after, or along with the image, FOV data representing the field-of-view of the camera when the mobile device captured the image. In some instances, one or more motion sensors, such as a gyroscope, accelerometer, or the like, may generate the FOV data. At "4", the correction module 130 on the projection device 104 calculates one or more calibration parameters for removing or lessening distortion from the projection from a perspective or field-of-view of the camera, which functions as a proxy for a perspective or vantage point of the user 108. While FIG. 3 illustrates the projection device 104 making these calculations, in other instances the application 142 on the mobile device 110 may do so.

At "5", upon calculating the calibration parameters the projection device may implement the parameters, thus updating the projection, which now has less distortion from the perspective of the user 108. In instances where the application 142 on the mobile device 110 calculates these parameters, at this step the mobile device 110 may provide the parameters to the projection device 104. Further, the scenario 300 may further include requesting that the user 108 repeat the process in order to verify that the distortion has been removed to a sufficient degree.

Figure 4:
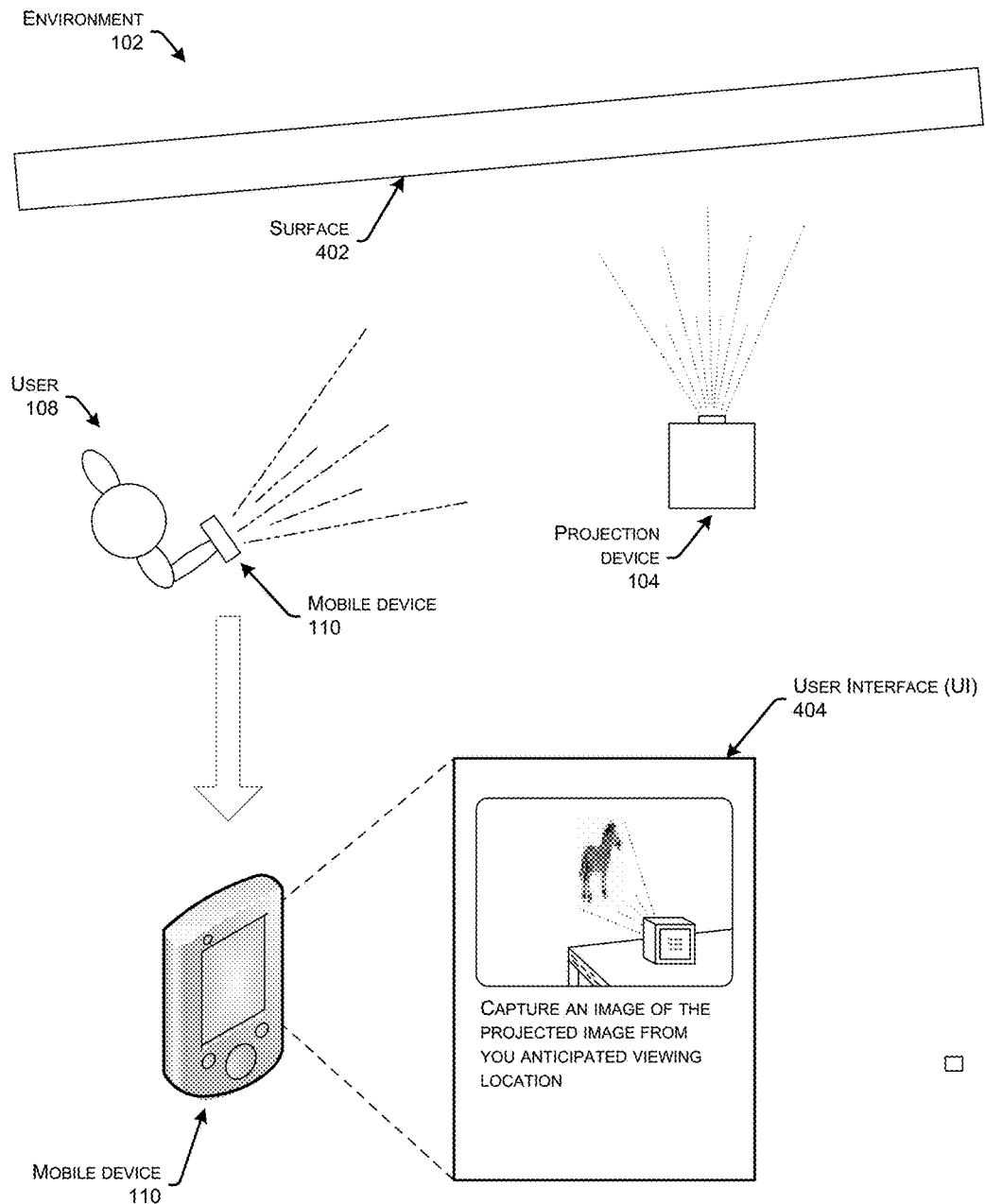
FIG. 4 illustrates an example screenshot of an image that the mobile device of the user captures of the projected image when the user is at a particular location within the user environment.

FIG. 4 illustrates an example screenshot of an image that the mobile device 110 of the user 108 captures of the projected image when the user 108 is at a particular location within the user environment 102. As illustrated, the projection device 104 projects an image onto a surface 402 within the user environment. However, certain features of the surface and/or the environment may introduce distortion. For instance, the image may be distorted based on the surface 402 being non-orthogonal to the optical axis of the projection device 104. Additionally or alternatively, distortion may be introduced due to the topography of the surface 402, potentially along with the location of the user 108 relative to the projection device 104 and the surface 402 and an orientation of the mobile device 110 when the user 108 uses the mobile device 110 to capture the image of the projection.

As illustrated, the companion application 142 executing on the mobile device 110 may present a user interface (UI) 404 that instructs the user 108 to capture an image of the projection at a location at which the user 108 anticipates viewing content projected by the projection device 104. In some instances, the UI 404 may further instruct the user 108 to capture some or all of the projection device 104 in the image. In either instance, the user may utilize the mobile device 110 to capture an image of at least a portion of the image being projected on the surface 402. In this example, the captured image also depicts the projection device 104.

The companion application 142 may then send the image (or multiple images) to the network service 112 or other location at which the correction module 130 for determining how to correct any distortion within the captured image. As described above, the mobile device 110 may additionally send, to the correction module 130, FOV data generated by one or more motion sensors for allowing the correction component to take into account the field-of-view of the camera of the mobile device 110 when determining how to correct any distortion. Also as described above, in some instances the correction module may use this FOV data to modify a reference image used by the projection device 104 to generate the projection prior to comparing the reference image to some or all of the captured image (in this instance, to the portion of the captured image corresponding to the distorted zebra).

Figure 5:
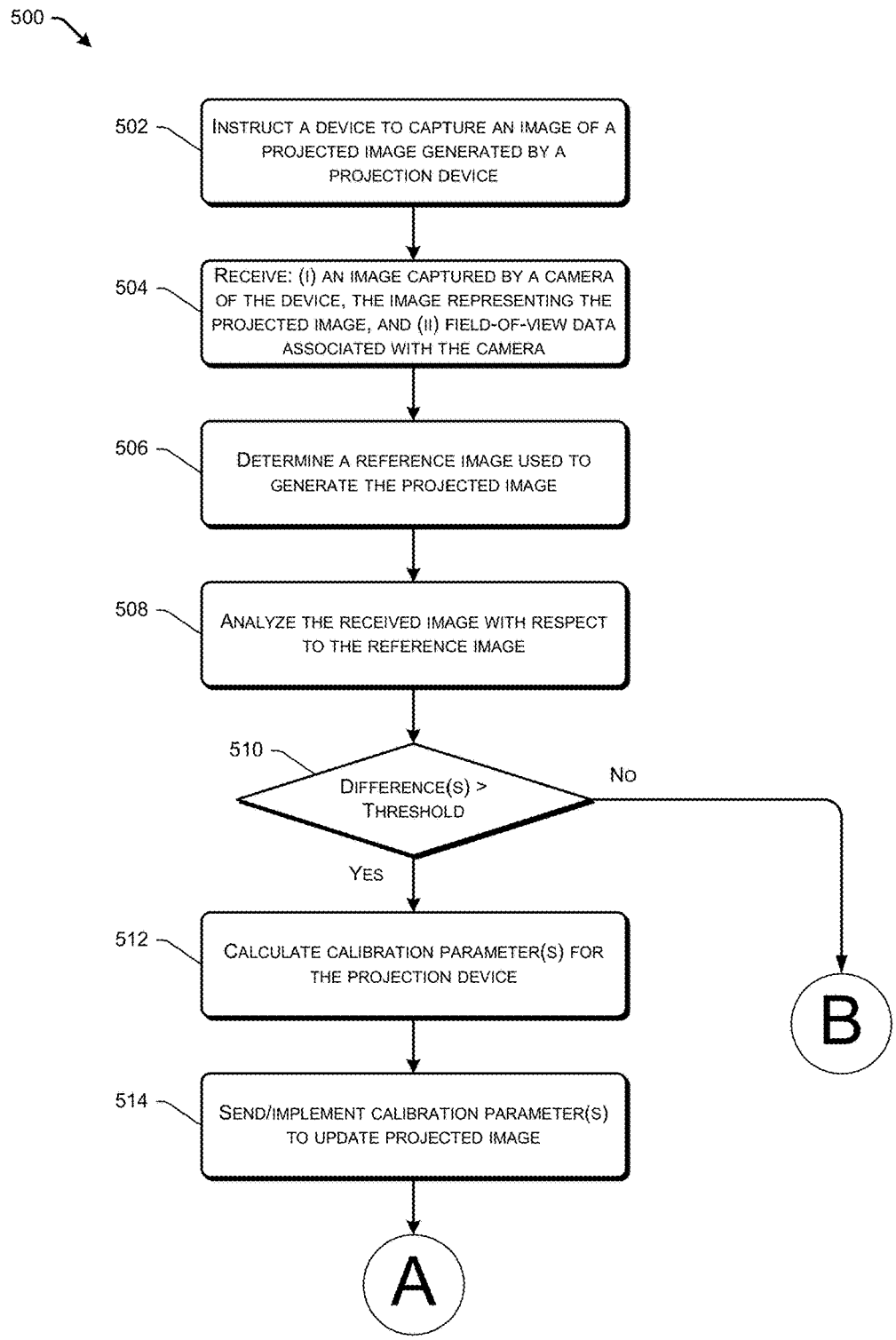
FIGS. 5-6 collectively illustrate an example flow diagram of a process for calibrating a projection device to correct distortion of an image being projected by the projection device.
Figure 6:
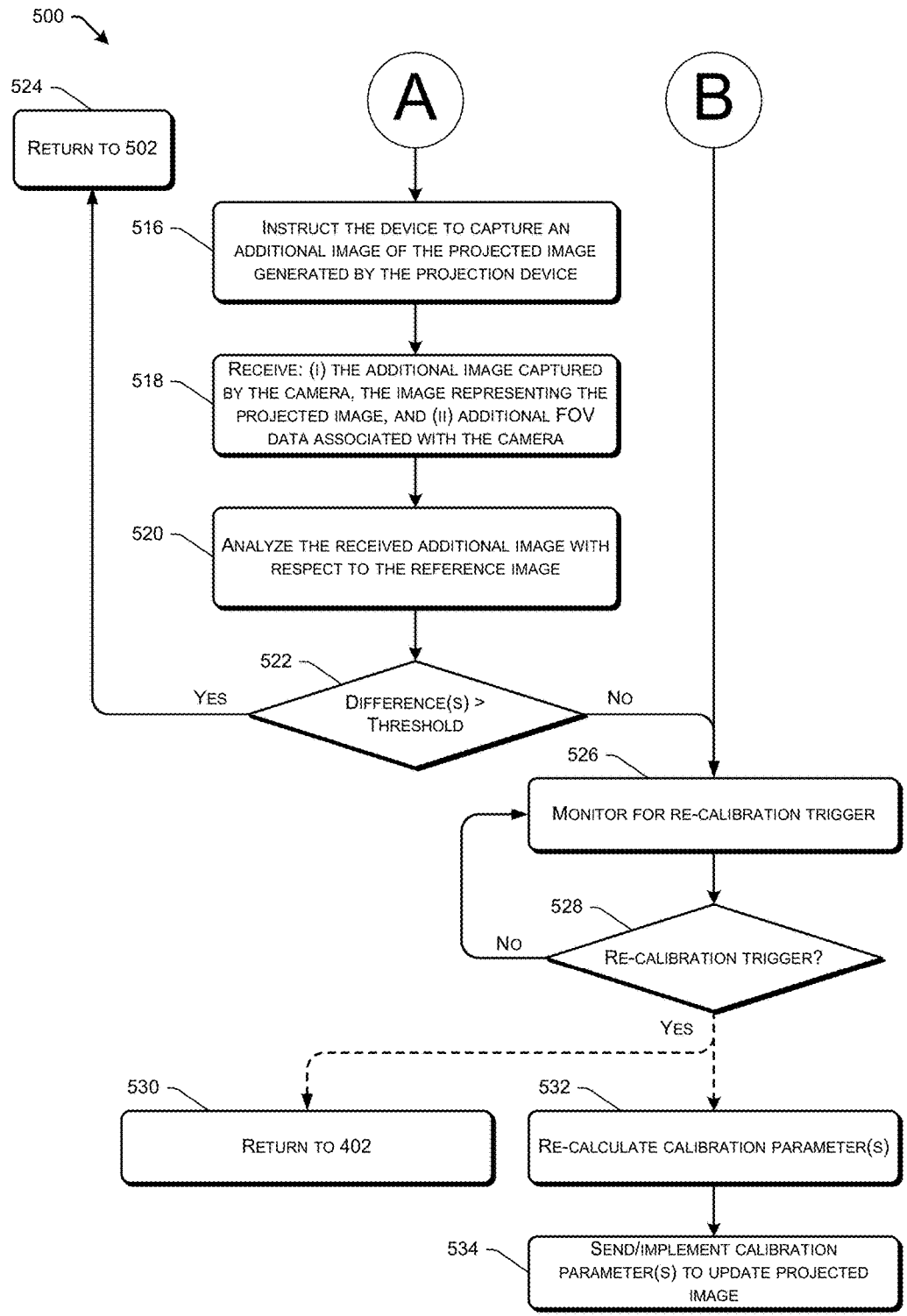

FIGS. 5-6 collectively illustrate an example flow diagram of a process 500 for calibrating a projection device to remove distortion from an image being projected by the projection device from the perspective of a user. This process may be performed by one or more instances of the correction module 130, which may reside at the network service 112, the mobile device 110, the projection device 104, and/or any other entity. Furthermore, this process (as well as each process described herein) is illustrated as a logical flow graph, each operation of which represents a sequence of operations that can be implemented in hardware, software, or a combination thereof. In the context of software, the operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

At 502, the correction module instructs a mobile device to capture an image of a projection being generated by a projection device. For instance, the application 142 may issue this instruction via a graphical user interface (GUI), via an audible command, or the like. At 504, the correction module receives an image of the projection captured by the camera of the mobile device and, at 506, determines a reference used to generate the image being projected. In some instances, the reference image comprises the image sent to the projection device for generating the projection. In other instances, the reference image comprises the image used by the projection device to generate the projection as modified by the FOV data of the mobile device. That is, and as described in further detail above, the data generated by one or more motion sensors of the mobile device may be used to determine and account for any distortion introduced into the captured image based on the field-of-view of the camera.

At 508, the correction module analyzes the projection, as represented by the received image, with the reference image to identify any differences there between. This may include identifying differences in shape, aspect ratio, color, brightness, sharpness, or the like. Further, as described above, analyzing the captured image with reference to the reference image may comprise comparing the image sent to the projection device to the captured image or comparing the image sent to the projection device as modified by the FOV data to the captured image.

At 510, the correction module may determine whether any of the differences are greater than a threshold. For instance, the correction module may determine whether a shape or aspect ratio of the projection differs from the reference image by more than a threshold amount. Additionally or alternatively, the correction module may determine whether a color of the projection differs from a color of the reference image by more than a threshold amount. In still another example, the correction module may determine whether a brightness or sharpness of the projection differs from the brightness or sharpness of the reference image by more than a threshold amount. If no differences greater than a threshold amount exist, then the process 500 proceeds to "B", discussed below with reference to FIG. 6.

If, however, differences that are greater than a threshold exist, then the process 500 proceeds to 512. Here, the correction module calculates one or more calibration parameters for use by the projection device to correct the distortion present in the projection of the image (at the location of the camera). At 514, the calibration parameters are then sent to and/or implemented by the projection device. For instance, if the network service 112 or the mobile device 110 calculates the parameters, then the parameters are sent to the projection device, which receives and implements them. If, however, the projection device 104 calculates the parameters, then the projection device directly implements the parameters. In either instance, the process 500 proceeds to "A", discussed immediately below.

FIG. 6 continues the illustration of the process 500. Continuing the process 500 at "A", at 516 the correction module instructs the mobile device to capture an additional image of the projection after implementation of the updated calibration parameters. At 518, the correction modules receives the additional image representing the updated projection. At 520, the correction module analyzes the received additional image with reference to the reference and, at 522, determines whether any differences exist that are greater than a threshold. If so, meaning that undesired distortion still exists, then at 524 the process 500 returns to 512 to calculate new calibration parameters and so forth.

If, however, no such differences exist, meaning that the distortion has been lessened to an acceptable level, then the process 500 proceeds to 526. Furthermore, if the correction module had previously determined at 510 that no such differences existed, then the process 500 also proceeds to 526. In some instances, the process 500 might not attempt to verify the new calibration parameters discussed with reference to operations 516-522.

At 526, the correction module monitors for a re-calibration trigger. That is, although calibration parameters have been calculated and implemented for correcting the distortion, in some instances certain events may occur that necessitate re-calibration. For instance, if the projection device moves, thus altering the angle of incidence of or distance to the projection surface, the calibration parameters may no longer be adequate to remove the distortion. Or, if the user is determined to have moved locations within the environment, the calibration parameters may no longer be effective to remove distortion from the new vantage point of the user. In still other instances, if a certain amount of time elapses or if the device is powered on (after having been off), then a re-calibration may be desired.

At 528, the correction module determines whether a re-calibration trigger has been detected. If not, then the correction module may continue to monitor for such a trigger. If, however, a trigger is detected, then the process 500 may, in some instances, return to 502 as illustrated at 530. That is, the correction module may request that the user capture a new image to begin the calibration process. In other instances, however, the correction module may update the calibration parameters without involvement of the user or the acquisition of additional images. For instance, at 532 the correction module may re-calculate the calibration parameters and may send or implement these parameters at 534. For instance, if re-calibration trigger comprises motion of the projection device, and if the projection device includes a motion sensor, the projection device may estimate an amount and direction of motion and may use this information to update the calibration parameters. For instance, after estimating the change in position of the projection device relative to the projection surface, the correction module may use keystone-correction algorithms to re-calculate the calibration parameters based on the previous parameters and the estimated orientation change. Similarly, if the re-calibration trigger comprises the user moving to a new location within the environment, and if the projection device is able to estimate this new location, then the projection device correction module may use keystone-correction algorithms to re-calculate the calibration parameters based on the previous parameters and the estimated new location of the user. In some instances, the projection device is configured to periodically or continuously monitor for changes in position or orientation and update the parameters "on-the-fly" (i.e., in real-time or in near-real-time).

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   one or more processors; and
   one or more computer-readable media storing computer-executable instructions that, when executed, cause the one or more processors to perform acts comprising:
      sending, to a mobile device within an environment, a request to capture image data corresponding to a projected image from a field-of-view of a camera of the mobile device;
      receiving first image data captured by the camera of the mobile device, the first image data representing, from the field-of-view of the camera, the projected image that a projection device projected onto a surface within the environment;
      receiving field-of-view data corresponding to the field-of-view of the camera of the mobile device;
      identifying second image data used by the projection device to generate the projected image;
      generating third image data that represents the second image data as modified by the field-of-view data;
      analyzing the first image data with respect to the third image data;
      identifying a difference between the first image data and the third image data, the difference related to at least one of a difference in shape, aspect ratio, color, brightness, or sharpness between the first image data and the third image data;
      determining that the difference is greater than a threshold amount;
      calculating an amount of horizontal and vertical keystone correction to apply to cause the difference to differ by less than the threshold amount; and
      sending the amount of horizontal and vertical keystone correction to at least one of the projection device or the mobile device.

2. The system as recited in claim 1, wherein the difference comprises a first difference, and the acts further comprising:
   receiving, from the mobile device, fourth image data captured by the camera of the mobile device, the fourth image data representing, from the field-of-view of the camera, the projected image after the projection device has applied the amount of horizontal and vertical keystone correction;

analyzing the fourth image data with respect to the second image data to identify a second difference between the projected image and the second image data; and determining that the second difference is less than the threshold amount.

3. The system as recited in claim 1, wherein the threshold amount comprises a first threshold amount, and the acts further comprising:

determining a first color of a first pixel of the projected image as represented by the first image data;

determining a second color of the first pixel as represented by the second image data;

determining that the first color differs from the second color by more than a second threshold amount; and sending an instruction to the at least one of the projection device or the mobile device instructing the projection device to alter the color of the first pixel projected by the projection device.

4. The system as recited in claim 1, wherein the threshold amount comprises a first threshold amount, and the acts further comprising:

determining a first brightness of a first pixel of the projected image as represented by the first image data;

determining a second brightness of the first pixel as represented by the second image data;

determining that the first brightness differs from the second brightness by more than a second threshold amount; and sending an instruction to the at least one of the projection device or the mobile device instructing the projection device to alter the brightness of the first pixel projected by the projection device.

5. A system comprising:

one or more processors; and one or more computer-readable media storing computer-executable instructions that, when executed, cause the one or more processors to perform acts comprising:

receiving from a mobile device in an environment:

image data captured by a camera of the mobile device, the image data representing a first projected image that a projection device projected onto a surface within the environment, and frame of view data corresponding to a field-of-view of the camera of the mobile device;

determining, based at least in part on the frame of view data, an angle of the mobile device relative to the surface within the environment;

determining first reference image data used by the projection device to generate the first projected image;

generating second reference image data based at least in part on the first reference image data and the angle of the mobile device relative to the surface;

analyzing the image data with respect to the second reference image data;

determining a difference between the image data and the second reference image data, the difference related to at least one of a shape, an aspect ratio, a color, a brightness, or a sharpness difference between the image data and the second reference image data;

determining that the difference is greater than a threshold amount;

determining, based at least in part on the difference being greater than the threshold amount, a calibration parameter for use by the projection device to generate a second projected image, wherein the calibration parameter is based at least in part on the angle of the mobile device; and sending the calibration parameter to at least one of the projection device or the mobile device.

6. The system as recited in claim 5, wherein the difference comprises at least one of:

a color difference between the image data and the second reference image data, and the calibration parameter at least partly corrects the color difference; or a brightness difference between the image data and the second reference image data, and the calibration parameter at least partly corrects the brightness difference.

7. The system as recited in claim 5, wherein the difference comprises a sharpness difference between the image data and the second reference image data, and the calibration parameter at least partly corrects the sharpness difference.

8. The system as recited in claim 5, the acts further comprising:

determining at least one of a make or model of at least one of the mobile device or the camera of the mobile device; and wherein determining the calibration parameter further comprises determining the calibration parameter based at least in part on the at least one of the make or model of the at least one of the mobile device or the camera of the mobile device.

9. The system as recited in claim 5, wherein the image data comprises first image data, and the acts further comprising:

receiving, from the mobile device, second image data captured by the camera of the mobile device, the second image data representing the second projected image;

analyzing the second projected image with respect to the second reference image data; and determining that a similarity between the second projected image and the second reference image data is greater than a similarity threshold.

10. The system as recited in claim 5, wherein the sending the calibration parameter comprises sending the calibration parameter to the at least one of the projection device or the mobile device to cause the projection device to at least one of:

dim a first pixel of the second projected image without dimming a second pixel of the second projected image;

brighten the first pixel of the second projected image without brightening the second pixel of the second projected image;

alter a color of the first pixel of the second projected image without altering a color of the second pixel of the second projected image; or alter a sharpness of the first pixel of the second projected image without altering a sharpness of the second pixel of the second projected image.

11. A method comprising:

receiving first image data captured by a camera of a mobile device within an environment, the image data representing, from a perspective of the camera, a projected image that a projection device projected onto a surface within the environment;

determining first reference image data used by the projection device to generate the projected image;

generating second reference image data based at least in part on the first reference image data and the perspective of the camera relative to the surface of the environment;

analyzing the first image data with respect to the second reference image data;

determining a difference related to a distortion between the first image data and the second reference image data;

determining that the difference is greater than a threshold amount;

determining, based at least in part on the difference being greater than the threshold amount, a calibration parameter for the projection device;

determining that the projection device has experienced a threshold amount of movement based at least in part on receiving motion data from a motion sensor of the projection device; and sending, based at least in part on the projection device experiencing the threshold amount of movement, an instruction to the mobile device to capture second image data of the projected image.

12. The method as recited in claim 11, wherein the analyzing comprises analyzing the first image data with respect to the second reference image data to identify the distortion in the projected image from the perspective of the camera relative to the second reference image data, the calibration parameter to at least partly correct the distortion.

13. The method as recited in claim 11, wherein the difference relates to a distortion in color between the first image data and the second reference image data, the calibration parameter to at least partly correct the distortion in color.

14. The method as recited in claim 11, wherein the difference relates to at least one of:
a distortion in brightness between the first image data and the second reference image data; or
a distortion in sharpness between the first image data and the second reference image data, and
wherein the calibration parameter at least one of partly corrects the distortion in brightness or partly corrects the distortion in sharpness.

15. The method as recited in claim 11, further comprising:
determining at least one of a make or model of at least one of the mobile device or the camera of the mobile device; and
wherein determining the calibration parameter further comprises determining the calibration parameter based at least in part on the at least one of the make or model of the at least one of the mobile device or the camera of the mobile device.

16. The method as recited in claim 11, further comprising:
receiving, from the mobile device, the second image data captured by the camera of the mobile device, the second image data representing the projected image;
analyzing the second image data relative to the second reference image data; and
determining that a similarity between the second image data and the second reference image data is greater than a similarity threshold.

17. The method as recited in claim 11, wherein the determining the calibration parameter comprises determining to cause the projection device to at least one of:
dim a first pixel of the projected image without dimming a second pixel of the projected image;
brighten the first pixel of the projected image without brightening the second pixel of the projected image;
alter a color of the first pixel of the projected image without altering a color of the second pixel of the projected image; or
alter a sharpness of the first pixel of the projected image without altering a sharpness of the second pixel of the projected image.

18. The system of claim 1, wherein the difference comprises a first difference and the field-of-view data comprises first field-of-view data, the acts further comprising:
receiving fourth image data captured by the camera of the mobile device, the fourth image data representing, from a second field-of-view of the camera, the projected image that the projection device projected onto the surface within the environment;
receiving second field-of-view data corresponding to the second field-of-view of the camera of the mobile device;
generating fifth image data that represents the second image data as modified by the second field-of-view data;
analyzing the fourth image data with respect to the fifth image data;
identifying a second difference between the fourth image data and the fifth image data;
calculating a second amount of horizontal and vertical keystone correction to apply to cause the second difference to differ by less than the threshold amount;
receiving data corresponding to a third field-of-view of the camera of the mobile device; and
interpolating a third amount of horizontal and vertical keystone correction for the third-field-of view using the first amount of horizontal and vertical keystone correction and the second amount of horizontal and vertical keystone correction.

19. The method as recited in claim 5, wherein the generating the second reference image data based at least in part on the angle of the mobile device relative to the surface adds a distortion to the first reference image data.

20. The method as recited in claim 11, further comprising sending, to the mobile device within the environment, a request to capture the first image data corresponding to the projected image from the perspective of the camera of the mobile device, wherein the request to capture the image data further comprises a request to capture at least a portion of the projection device and the projected image within the first image data.

* * * * *